US011359760B2

(12) United States Patent
Huang et al.

(10) Patent No.: US 11,359,760 B2
(45) Date of Patent: Jun. 14, 2022

(54) HINGE DEVICE

(71) Applicant: SYNCMOLD ENTERPRISE CORP., New Taipei (TW)

(72) Inventors: Chun-Hao Huang, New Taipei (TW); Chien-Cheng Yeh, New Taipei (TW)

(73) Assignee: SYNCMOLD ENIERPRISE CORP., New Taipei (TW)

( * ) Notice: Subject to any disclaimer, the term of this patent is extended or adjusted under 35 U.S.C. 154(b) by 406 days.

(21) Appl. No.: 16/689,673

(22) Filed: Nov. 20, 2019

(65) Prior Publication Data

US 2020/0191323 A1 Jun. 18, 2020

Related U.S. Application Data

(60) Provisional application No. 62/780,462, filed on Dec. 17, 2018.

(30) Foreign Application Priority Data

Aug. 9, 2019 (TW) .................................. 108210554

(51) Int. Cl.
| | |
|---|---|
| *F16M 11/10* | (2006.01) |
| *F16F 1/26* | (2006.01) |
| *F16F 3/02* | (2006.01) |

(52) U.S. Cl.
CPC ............... *F16M 11/10* (2013.01); *F16F 1/26* (2013.01); *F16F 3/023* (2013.01);
(Continued)

(58) Field of Classification Search
CPC .. F16M 11/10; F16M 11/24; F16M 2200/041; F16F 3/023; F16F 1/26;
(Continued)

(56) References Cited

U.S. PATENT DOCUMENTS

| 4,657,292 A * | 4/1987 | Bruck ..................... E05B 77/06 |
| | | 292/DIG. 4 |
| 6,018,847 A * | 2/2000 | Lu .......................... F16M 11/10 |
| | | 16/337 |

(Continued)

*Primary Examiner* — Eret C McNichols
*Assistant Examiner* — Michael McDuffie
(74) *Attorney, Agent, or Firm* — Muncy, Geissler, Olds & Lowe, P.C.

(57) ABSTRACT

A hinge device for supporting a display device is provided. The hinge device comprises a supporting seat, a shaft, a bearing plate, and an elastic module. The shaft rotatably passes through the supporting seat. The bearing plate is disposed on the shaft, and the display device is disposed on the bearing plate. The elastic module includes a cam and at least one elastic plate. The cam is configured on the shaft, and the cam and the shaft rotate synchronously. A fixed end of the elastic plate is fixed to the supporting seat. The elastic plate has a deformation amount to provide a balance torque to the cam when a free end of the elastic plate abuts against the cam. When an external force is applied on the display device, the bearing plate is actuated to drive the shaft and the cam to rotate to change the deformation amount and the balance torque of the elastic plate. When the external force is removed, the display device can be stopped at once.

16 Claims, 9 Drawing Sheets

(52) U.S. Cl.
CPC . *F16F 2228/066* (2013.01); *F16F 2230/0005* (2013.01); *F16M 2200/041* (2013.01)

(58) Field of Classification Search
CPC .......... F16F 2228/066; F16F 2230/0005; F16F 2230/0064
USPC .......... 248/123.11, 123.2, 125.1, 125.2, 575, 248/576, 121, 122.1, 288.11, 291.1, 248/292.11, 292.13, 292.14, 364, 917, 248/918, 919, 922, 923
See application file for complete search history.

(56) References Cited

U.S. PATENT DOCUMENTS

| | | | | |
|---|---|---|---|---|
| 6,108,868 A * | 8/2000 | Lin | ........................ | G06F 1/1681 16/334 |
| 6,189,842 B1 * | 2/2001 | Bergeron Gull | ....... | F16M 11/24 248/283.1 |
| 6,994,306 B1 * | 2/2006 | Sweere | ................ | F16M 13/022 248/295.11 |
| 6,997,422 B2 * | 2/2006 | Sweere | .............. | F16M 11/2092 248/123.11 |
| 7,677,509 B2 * | 3/2010 | Jang | ........................ | F16M 11/24 248/176.1 |
| 8,033,513 B2 * | 10/2011 | Jang | ................... | F16M 11/2021 361/679.02 |
| 8,047,479 B2 * | 11/2011 | Liu | ...................... | F16M 11/105 248/920 |
| 8,596,591 B2 * | 12/2013 | Theis | ..................... | F16M 11/18 248/122.1 |
| 8,659,884 B2 * | 2/2014 | Segar | ....................... | H05K 7/00 361/679.22 |
| 8,925,154 B2 * | 1/2015 | Ergun | .................... | F16M 11/28 16/342 |
| 9,167,707 B1 * | 10/2015 | Wang | ..................... | F16M 11/28 |
| 10,401,916 B1 * | 9/2019 | Sanchez | ................ | G06F 1/1681 |
| 10,443,285 B2 * | 10/2019 | Fang | ......................... | E05F 3/20 |
| 2007/0262210 A1 * | 11/2007 | Oh | ......................... | F16M 11/28 248/917 |
| 2015/0053830 A1 * | 2/2015 | Kuo | ..................... | F16M 11/046 248/297.11 |
| 2015/0102188 A1 * | 4/2015 | Aoyagi | ................. | F16M 11/046 188/67 |
| 2018/0356023 A1 * | 12/2018 | Yen | ........................ | F16M 11/10 |

\* cited by examiner

HINGE DEVICE

CROSS REFERENCE TO RELATED APPLICATION

This application claims the benefit of U.S. Provisional Application Ser. No. 62/780,462 filed on Dec. 17, 2018, and the benefit of Taiwan Patent Application Serial No. 108210554 filed on Aug. 9, 2019. The entirety of each Application is incorporated herein by reference.

BACKGROUND OF THE INVENTION

1. Field of the Invention

The present invention relates to a hinge device. More particularly, the present invention relates to a hinge device that uses a leaf spring to provide a part of supporting force to support a display device.

2. Description of Related Art

The conventional supporting device comprises an upright, a securing element, and a hinge element. The securing element is adapted to connect a display to the supporting device, and the hinge element is connected between the upright and the securing element. The conventional hinge element includes a torsional spring. When the display is disposed on the securing element, the torsional spring is distorted by the force and provides a rebounding torque against a downward torque generated by the weight of the display. The display can be kept at a watching angle.

However, a proper specification of the hinge element with the torsional spring structure is chosen according to the weight of the display that is supported. If the hinge element that provides an adjustable rebounding torque is used to fit different specifications of the displays, the structure of the hinge element would become too complicated and uncompetitive for the difficulties of manufacturing and operation and high production cost.

SUMMARY OF THE INVENTION

While the conventional hinge element adapts the torsional spring as an essential element to keep balance, the objective of the present invention is to provide a novel hinge device to keep the excellent handling feel by replacing the conventional torsional spring element with an elastic plate while the hinge device rotates. Moreover, the structure of the hinge device of the present invention is simplified to match the needs of light-weight and thickness and to lower the manufacturing and assembly cost. Furthermore, the resistance of the hinge structure of the present invention is adjustable so that the hinge structure of the present invention is suitable for different scales of displays.

To achieve the above objective, the present invention provides a hinge device for supporting a display device. The hinge device comprises a supporting seat, a shaft, a bearing plate, and an elastic module. The shaft rotatably passes through the supporting seat along an axis. The bearing plate is disposed on the shaft and rotates along with the shaft relative to the supporting seat. The bearing plate bears the display device and is adapted to tilt between a first position and a second position. The elastic module includes a cam and at least one elastic plate. The cam is configured on the shaft and rotates synchronously with the shaft. The elastic plate extends towards a direction that is not parallel to the axis and has an inflexible section and a flexible section. The inflexible section and the flexible section are connected to each other and define a fixed end and a free end. The lengths of the inflexible section and the flexible section are changeable. The fixed end is fixed to the supporting seat, and the free end abuts against the cam optionally. The elastic plate has a deformation amount to provide a balance torque to the cam when the elastic plate abuts against the cam. When an external force is applied on the display device to adjust a tilt angle, the bearing plate is actuated to drive the shaft to rotate so that the cam rotates synchronously to change the deformation amount and the balance torque of the elastic plate. When the external force is removed, the display device can be stopped at once at a position between the first position and the second position relative to a supporting device.

The display device constantly provides a main torque to the shaft. The direction of the balance torque is opposite to the direction of the main torque so that the balance torque is against the main torque. When the display device and the bearing plate rotate from the first position to the second position, the main torque gradually increases and the balance torque also gradually increases. When the display device and the bearing plate rotate from the second position to the first position, the main torque gradually decreases and the balance torque also gradually decreases.

The cam has a first abutting part and a second abutting part. The distance between the first abutting part and the axis is smaller than the distance between the second abutting part and the axis. When the bearing plate is at the first position, the elastic plate abuts against the first abutting part of the cam. When the bearing plate is at the second position, the elastic plate abuts against the second abutting part of the cam.

The cam further has a curved surface section between the first abutting part and the second abutting part.

The supporting seat includes a main body and two side plates. The side plates extend outwards from two sides of the main body, and the shaft passes through the side plates.

The supporting seat further includes at least one positioning hole and at least one connecting element. The positioning hole is formed on an upper surface of the main body. The fixed end of the elastic plate has a threaded hole. The connecting element passes through the threaded hole and then is tightened in the positioning hole.

In one embodiment, the cam has a through hole formed at an axle center of the cam for the shaft passing through.

In another embodiment, the cam is a cylinder and has a through hole eccentrically formed on the cam for the shaft passing through.

In another embodiment, the cam and the shaft are integrated.

The supporting seat further includes an upper stopper and a lower stopper. When the cam is at the first position, the bearing plate abuts against the upper stopper. When the cam is at the second position, the bearing plate abuts against the lower stopper.

In one embodiment, the elastic module further includes at least one screw hole and at least one abutting element. The screw hole is formed on the cam and connected to the through hole. The abutting element passes through the screw hole and abuts against the shaft so that the shaft is fixed to the cam, and the cam and the shaft rotate synchronously.

The elastic plate is a leaf spring and has a thickness between 2-10 millimeters.

In a preferred embodiment, a number of the at least one elastic plate is larger than or equal to two. The screw hole of the at least one elastic plate is an elongated hole. The screw hole has a front end adjacent to the shaft and a rear end away from the shaft. When the corresponding connecting element is screwed at the front end, the corresponding elastic plate does not abut against the cam.

The hinge device further comprises an adjustment module. The adjustment module is disposed on the supporting seat and optionally presses against different positions of the elastic plate to change the length of the flexible section of the elastic plate.

The adjustment module includes a pressing element that can optionally move relative to the elastic plate. The length of the flexible section of the elastic plate is changed through adjusting a position of the pressing element relative to the elastic plate.

The adjustment module further includes two sliding slots and at least one securing element. The pressing element has at least one screw hole. The sliding slots are respectively formed on the side plates. The pressing element is movably disposed in the sliding slots. The securing element detachably passes through the screw hole of the pressing element to tighten the elastic plate.

DETAILED DESCRIPTION OF THE PREFERRED EMBODIMENT

Please refer to FIG. 1 to FIG. 5, a hinge device 1000 is connected between a display device 2000 and a supporting device 3000. The display device 2000 can rotate about an axis X between a first position and a second position relative to the supporting device 3000. The supporting device 3000 extends along an extending direction A. The hinge device 1000 comprises a supporting seat 1, an elastic module 2, a shaft 4, an adjustment module 6, and a bearing plate 7. The supporting seat 1 is secured on the supporting device 3000. In other embodiments, the supporting seat 1 is slidably disposed on the supporting device 3000. The elastic module 2 is disposed on the supporting seat 1, and the shaft 4 passes through the supporting seat 1 along the axis X. The bearing plate 7 is adapted to bear the display device 2000, and is rotatably disposed on the supporting seat 1.

Figure 1:
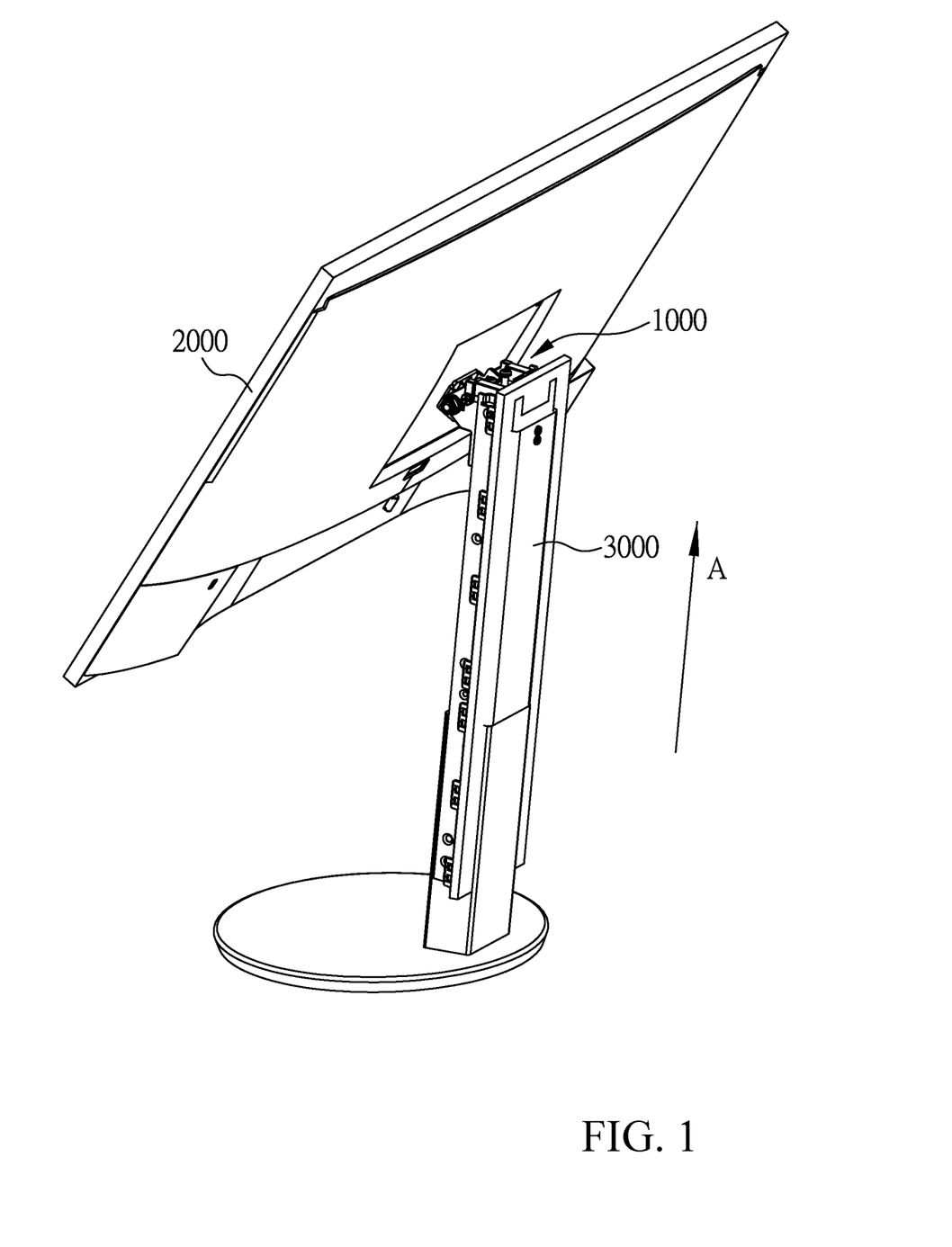
FIG. 1 is a perspective view showing a use state of the hinge device of an embodiment of the present invention connected to a supporting device and a display.
Figure 2:
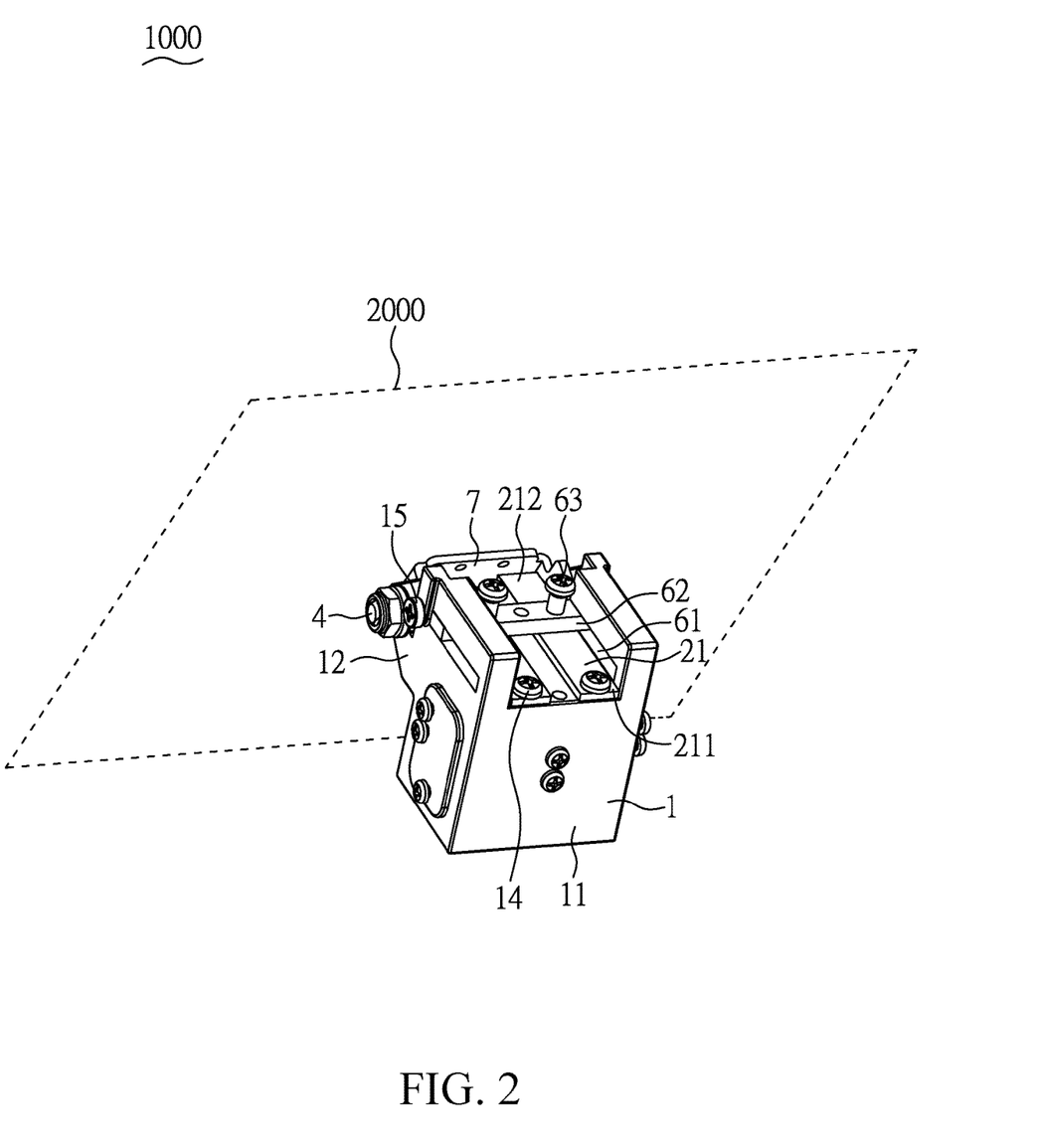
FIG. 2 is a perspective view showing the hinge device of an embodiment of the present invention.
Figure 3:
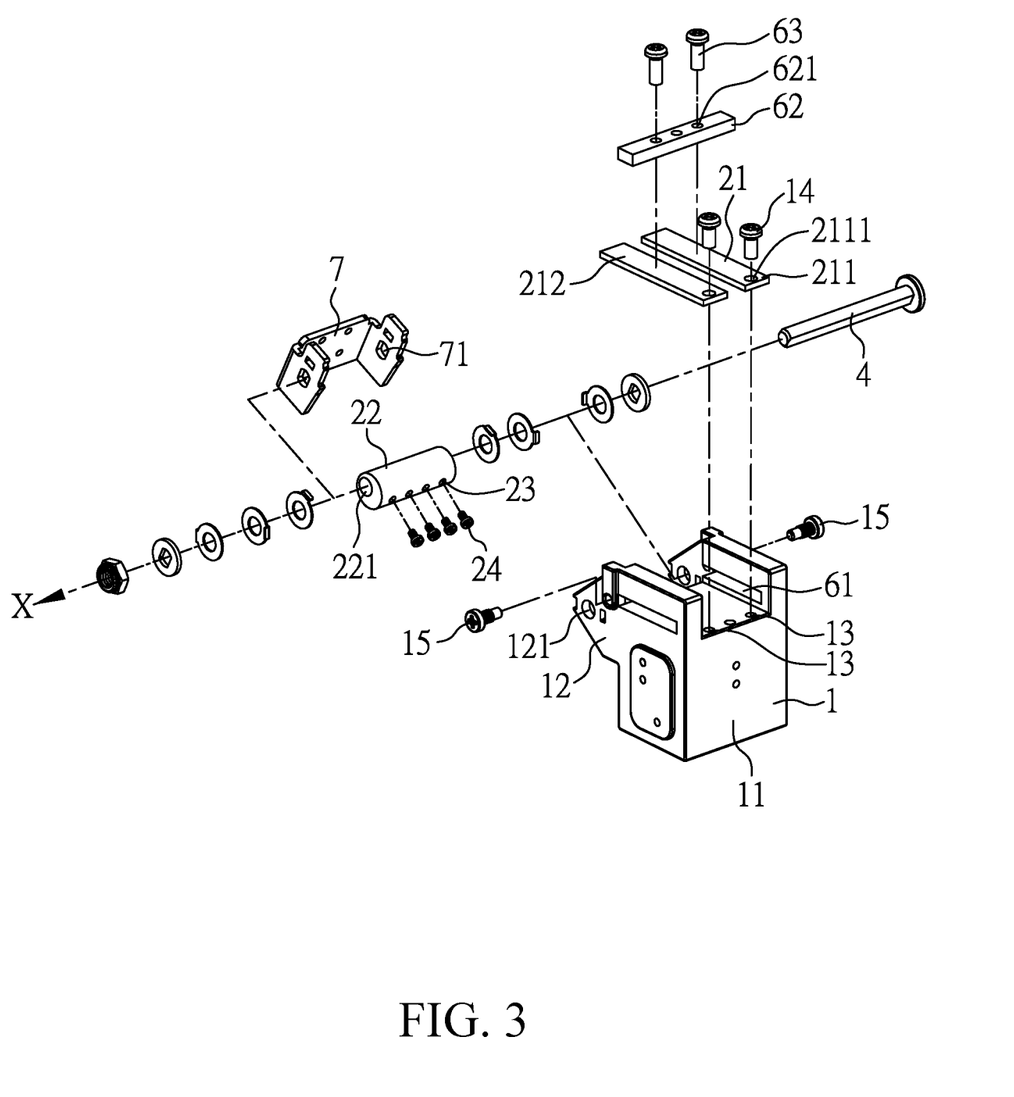
FIG. 3 is an exploded perspective showing the hinge device of an embodiment of the present invention.
Figure 4:
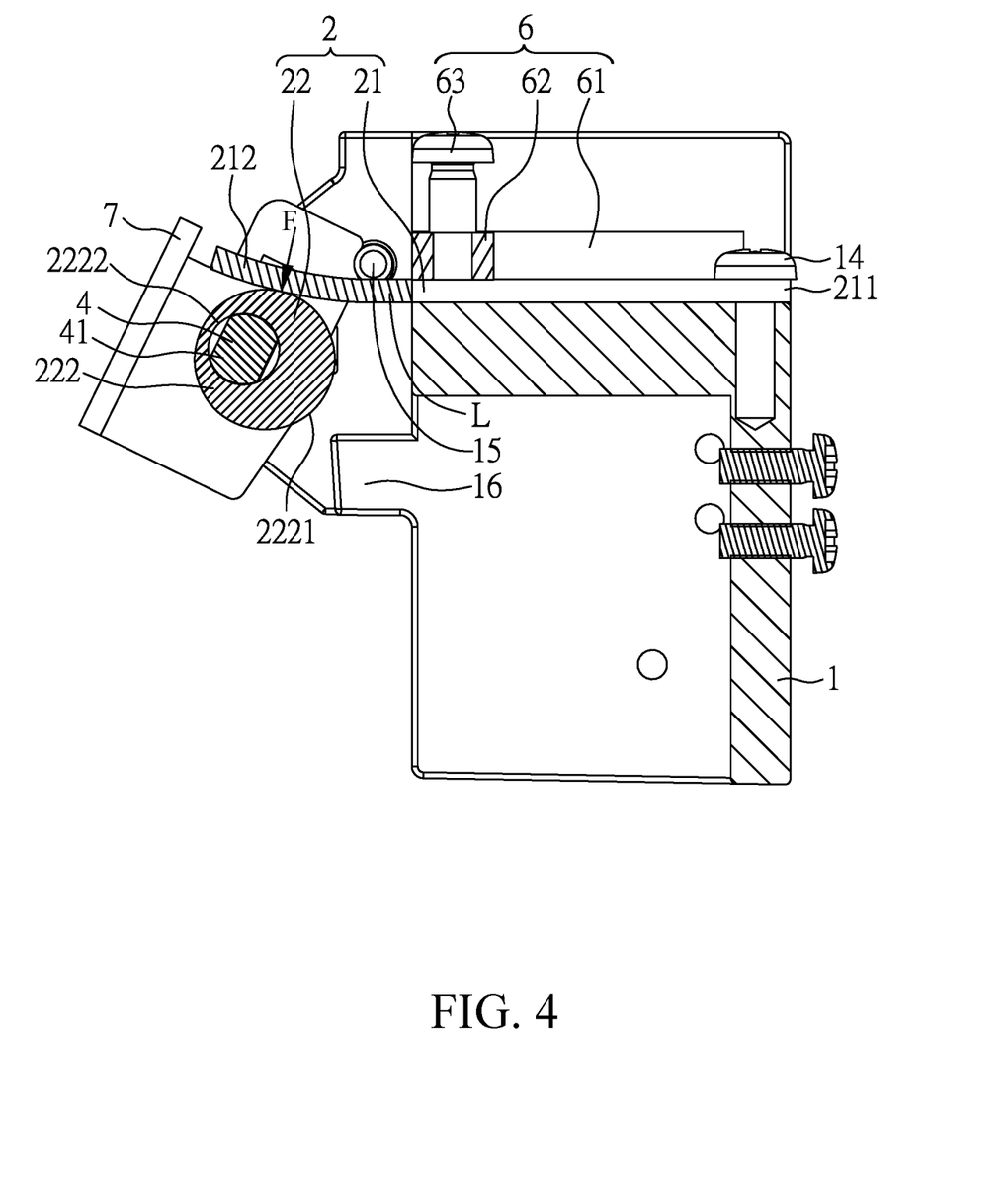
FIG. 4 is a cross-sectional view showing an operation of the hinge device of an embodiment of the present invention.
Figure 5:
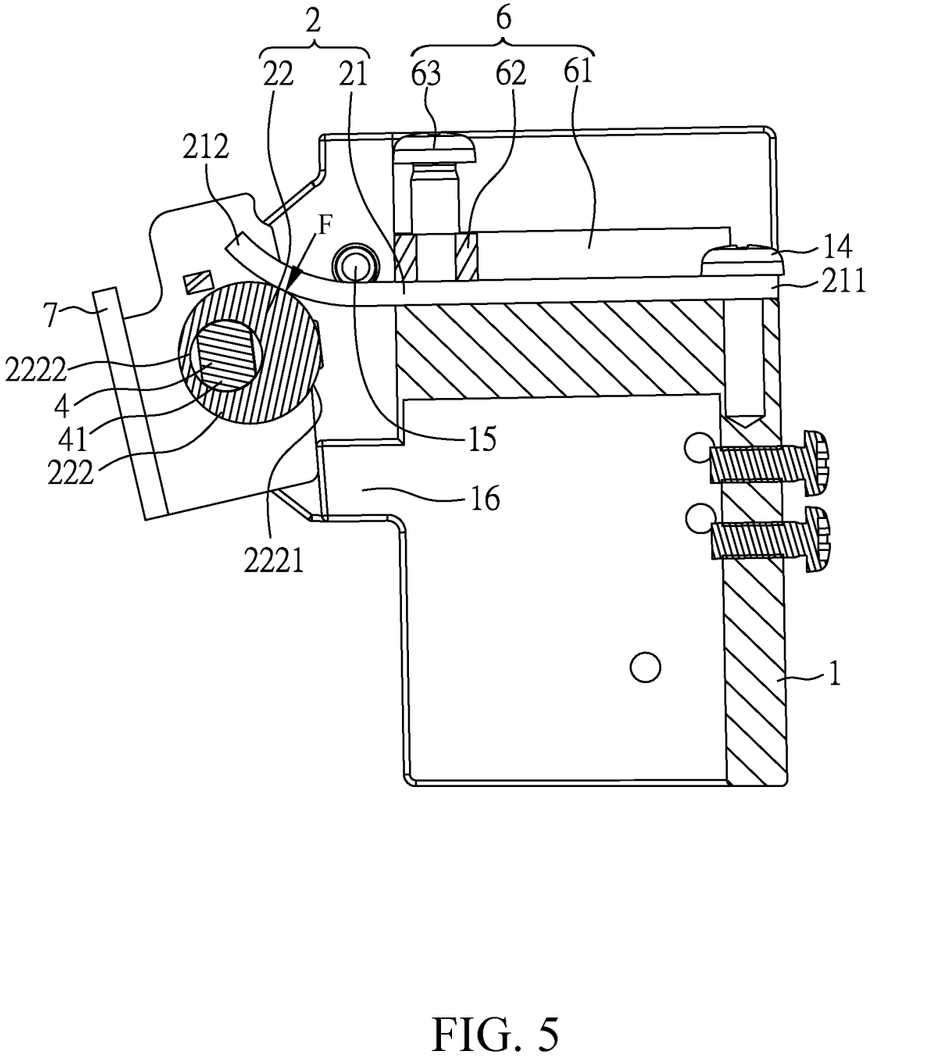
FIG. 5 is a cross-sectional view showing another operation of the hinge device of an embodiment of the present invention.

The supporting seat 1 includes a main body 11, two side plates 12, two positioning holes 13, two connecting elements 14, two upper stoppers 15, and two lower stoppers 16. The main body 11 is disposed on the supporting device 3000. Each of the side plates 12 has an axial hole 121, and the side plates 12 extend outwards from two sides of the main body 11 respectively. The positioning holes 13 are formed on an upper surface of the main body 11. The connecting elements 14 are detachably screwed in the positioning holes 13. In the present embodiment, the connecting elements 14 are screws. The upper stoppers 15 are screws and screwed on the side plates 12. The lower stoppers 16 are projections and extend from the side plates 12. The first position is defined as the bearing plate 7 abutting against the upper stoppers 15 as shown in FIG. 4. The second position is defined as the bearing plate 7 abutting against the lower stoppers 16 as shown in FIG. 5. It means that the rotation range of the bearing plate 7 is limited by the upper stoppers 15 and the lower stoppers 16. Therefore, the display device 2000 would not interfere with the supporting device 3000 during the rotation.

The elastic module 2 includes two elastic plates 21, a cam, 22, at least one screw hole 23, and at least one abutting element 24. The elastic plates 21 extend along a direction perpendicular to the extending direction A. Each of the elastic plates 21 has a fixed end 211 and a free end 212, which are located opposite to each other. Each of the fixed ends 211 has a threaded hole 2111. The positioning holes 13 are respectively corresponding to the threaded holes 2111. The connecting elements 14 respectively pass through the threaded holes 2111 and are tightened in the positioning holes 13 to fix the fixed ends 211 to the main body 11. The thickness of each of the elastic plates 21 is preferred between 2-10 millimeters. In the present embodiment, the elastic plates 21 are leaf springs. The cam 22 abuts against the free ends 212 so that each of the free ends 212 constantly has a deformation amount. The cam 22 has a through hole 221 for the shaft 4 to pass through. As the cam 22 rotates relative to the supporting seat 1, the degree that the cam 22 abuts against the elastic plates 21 would differ. The elastic plates 21 correspondingly provide a changeable resilience F. In other words, when the larger the degree that the cam 22 abuts against the elastic plates 21 is, the larger the deformation amount of the elastic plates 21 is, and the larger the resilience F that the elastic plates 21 react to the cam 22 is. The screw holes 23 are formed on the cam 22 and connected to the through hole 221. The abutting elements 24 pass through the screw holes 23 respectively and abut against the shaft 4. In the present embodiment, the abutting element 24 is a screw and externally threaded, the screw hole 23 is internally threaded, and the screw hole 23 and the abutting element 24 are able to engage with each other.

When the display device 2000 is disposed on the hinge device 1000, the weight of the display device 2000, the resilience F of the elastic plates 21 and the frictional forces among all elements make a resulting torque applied on the cam 22 is zero. When the display device 2000 is applied with an external force, the display device 2000 is pushed by the external force and rotates relative to the supporting seat 1. When the external force is removed, the display device 2000 can be stopped at once at a position between the first position and the second position relative to the supporting seat 1. In other words, once the external force applied on the display device 2000 is removed, the display device 2000 stops relative to the supporting seat 1.

More specifically, the weight of the display device 2000 provides a main torque to the shaft 4, and the resilience F provides a balance torque to the shaft 4. The direction of the balance torque is opposite to the direction of the main torque to countervail the main torque.

The connection between the cam 22 and the shaft 4 is then described in detail. Please refer to FIG. 3, FIG. 4, and FIG. 5. The shaft 4 passes through the axial holes 121 of the side plates 12, the through hole 221 of the cam 22, and two axial holes 71 of the bearing plate 7 along the axis X. In the present embodiment, the axial holes 71 are elongated holes to correspond to the cross-section of the shaft 4. The axial holes 121 and the through hole 221 are round holes. Although the through hole 221 is a round hole, the cam 22 can rotate synchronously with the shaft 4 about the axis X relative to the supporting seat 1 by passing the abutting element 24 through the screw hole 23 to abut against the shaft 4. More specifically, a cross-section 222 of the cam 22 is perpendicular to the axis X and has an outer periphery 2221 and an inner periphery 2222. In the present embodiment, the inner periphery 2222 has a round shape. The cross-section 41 of the shaft 4 is flat, i.e. elongated, instead of round and matches the axial holes 71. The shaft 4 contacts part of the inner periphery 2222. Therefore, the abutting element 24 should be screwed to tighten the shaft 4 in the cam 22, and then the cam 22 and the shaft 4 are actuated together. In other embodiments, the through hole 221 can be an elongated hole that matches the shaft 4, and the inner periphery 2222 matches the cross-section 41 of the shaft 4. The screw hole 23 and the abutting element 24 can be thereby omitted. However, the cost would be higher if the through hole 221 is made into an elongated hole in the production process. Therefore, the solution that matches the screw hole 23, the abutting element 24, and the round through hole 221 is provided in the present embodiment. Furthermore, in other embodiments, the cam 22 and the shaft 4 can be integrated, and the screw hole 23 and the abutting element 24 can be thereby omitted.

When the display 2000 is at the first position, the weight of the display device 2000 generates the least torque to the shaft 4. On the contrary, when the display 2000 is at the second position, the weight of the display device 2000 generates the most torque to the shaft 4. In order to provide a consistent handling feel while the user rotates the display device 2000, when the display device 2000 rotates from the first position to the second position, the larger the extent (that the cam 22 abuts against the elastic plates 21) is, the larger the resilience F (that the increasing deformation amount of the elastic plates 21 results) is. Therefore, when the handling feel is consistent, the main torque gradually increases and the balance torque gradually increases when the display device 2000 and the bearing plate 7 rotate from the first position to the second position. The main torque gradually decreases and the balance torque gradually decreases when the display device 2000 and the bearing plate 7 rotate from the second position to the first position.

Figure 6:
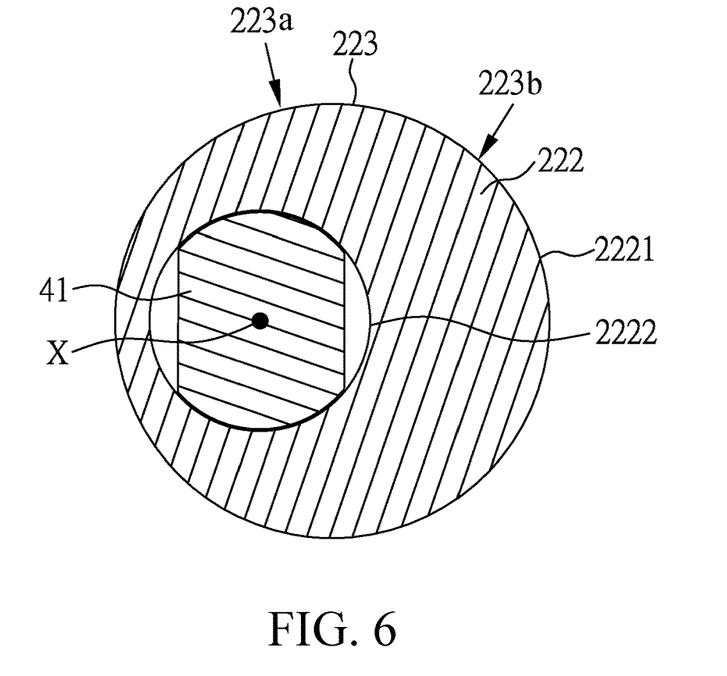
FIG. 6 is a partial cross-sectional of the hinge device of an embodiment of the present invention.
Figure 7:
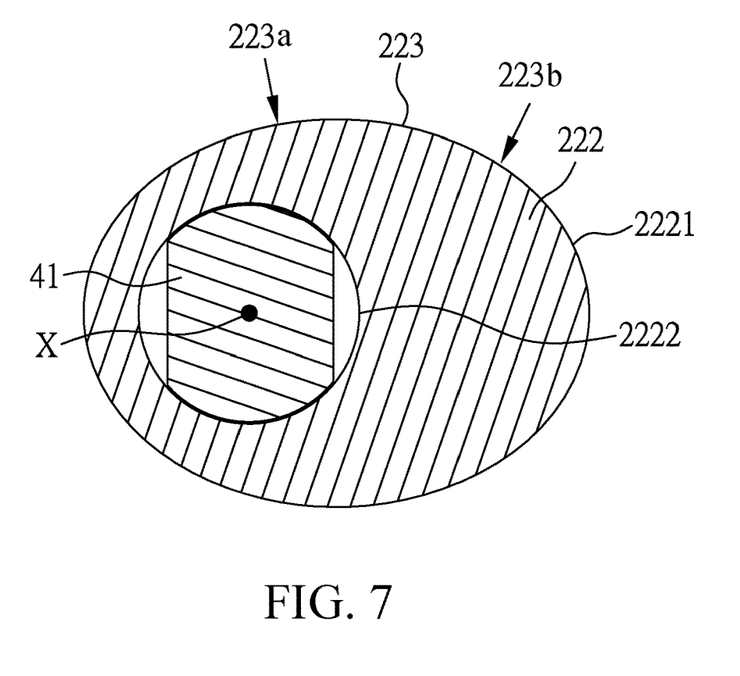
FIG. 7 is a partial cross-sectional of the hinge device of another embodiment of the present invention.
Figure 8:
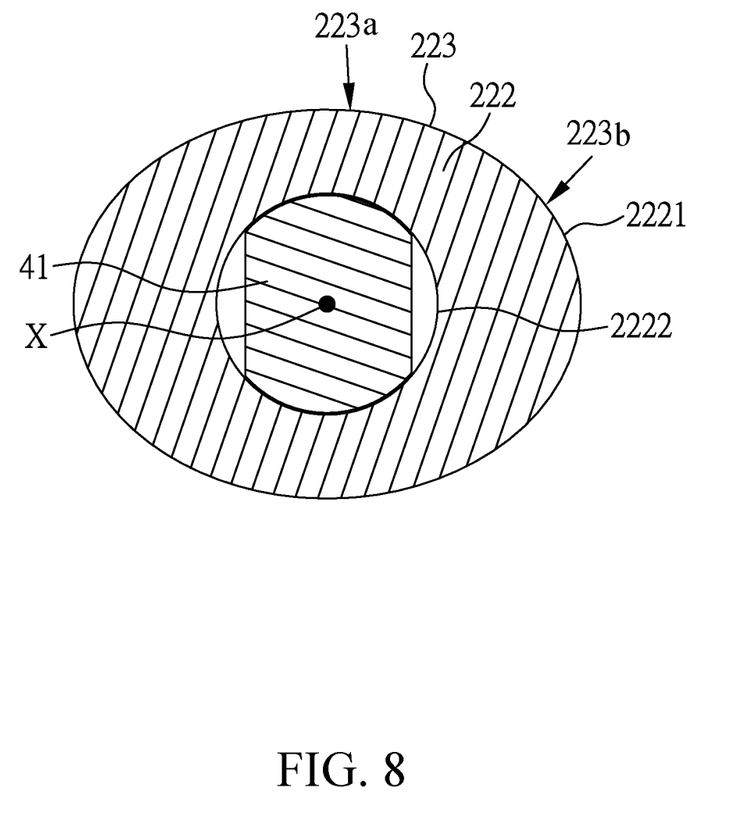
FIG. 8 is a partial cross-sectional of the hinge device of another embodiment of the present invention.

Please refer to FIG. 6, FIG. 7, and FIG. 8, the shape of the outer periphery 2221 can be round-shaped or a circular arc-shaped, which is not round. It should be noted that when the outer periphery 2221 is round-shaped, the inner periphery 2222 should be eccentric relative to the outer periphery 2221 as shown in FIG. 6 in the present embodiment. That is, the cam 22 is an eccentric cylinder. Therefore, the cam 22 may abut against the elastic plates 21 with different degrees and result in different deformation amounts of the elastic plates 21 when the cam 22 rotates relative to the supporting seat 1. In other embodiments, the inner periphery 2222 and the outer periphery 2221 are not limited to be eccentric if the outer periphery is not round as shown in FIG. 7 and FIG. 8.

In other words, the cam 22 is substantially a cam having the axis X as the axle center and having a curved surface section 223 that is gradually distant from the axis X.

In detail, the cam 22 has a first abutting part 223a and a second abutting part 223b. When the bearing plate 7 is at the first position, the elastic plate 21 abuts against the first abutting part 223a of the cam 22. When the bearing plate 7 is at the second position, the elastic plate 21 abuts against the second abutting part 223b of the cam 22. The distance between the first abutting part 223a and the axis X is smaller than the distance between the second abutting part 223b and the axis X. The curved surface section 223 is located between the first abutting part 223a and the second abutting part 223b, and the distance between the curved surface section 223 and the axis X gradually increases from the first abutting part 223a to the second abutting part 223b.

Figure 9:
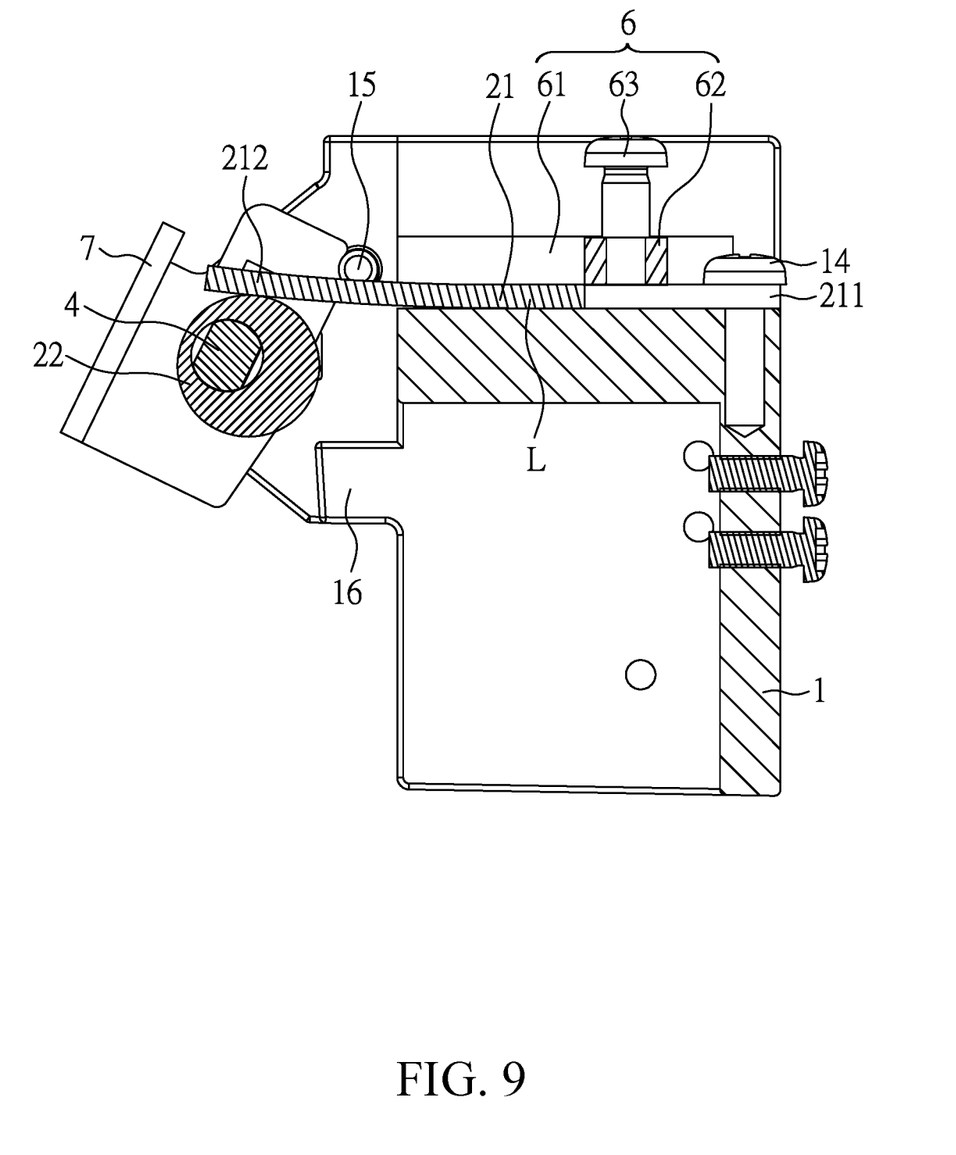
FIG. 9 is a cross-sectional view showing another operation of the hinge device of an embodiment of the present invention.

FIG. 4 and FIG. 9 illustrate the operation of the adjustment module 6 at two different positions respectively. The adjustment module 6 is configured on the supporting seat 1 and presses against the elastic plates 21 to adjust a flexible section L and an inflexible section of the elastic plates 21 so that the user can adjust the resilience F of the elastic plates 21 when the display device 2000 is at the same position. The flexible section L and the inflexible section are connected to each other and defining a fixed end 211 and a free end 212. The lengths of the flexible section L and the inflexible section are changeable through the adjustment module 6. The adjustment module 6 includes two sliding slots 61, a pressing element 62, and a securing element 63. The sliding slots 61 are symmetrically formed on the side plates 12. The pressing element 62 is movably disposed in the sliding slots 61 and presses on the elastic plates 21. The securing element 63 detachably passes through the pressing element 62 to press on the elastic plate 21. When the user operates the hinge device 1000 of the present invention, the pressing element 62 can be moved to different positions in the sliding slots 61. The pressing element 62 can be secured to a secured position by tightening the securing element 63. When the elastic plates 21 are deformed by being pushed against by the cam 22, the pressing element 62 pushes against the upper edge of the sliding slots 61 instead of moving relative to the elastic plates 21. In the present embodiment, the securing element 63 is a screw being externally threaded. The pressing element 62 is a cuboid block and has a screw hole 621, which is internally threaded, for the securing element 63 to pass through.

The pressing element 62 of the adjustment module 6 and the free ends 212 define the flexible section L. By the means of adjusting the position of the pressing element 62 locating on the elastic plates 21, the length of the flexible section L is changeable. The elastic plates 21 can thereby provide different degrees of initial resilience F to match the display devices 2000 of different weights. When the cam 22 is at the first position, the flexible section L of the elastic plates 21 would be longer and the resilience F of the elastic plates 21 to the cam 22 would be smaller if the pressing element 62 is closer to the fixed ends 211 of the elastic plates 21. On the contrary, the flexible section L of the elastic plates 21 would be shorter and the resilience F of the elastic plates 21 to the cam 22 would be larger if the pressing element 62 is closer to the free ends 212 of the elastic plates 21.

Figure 10:
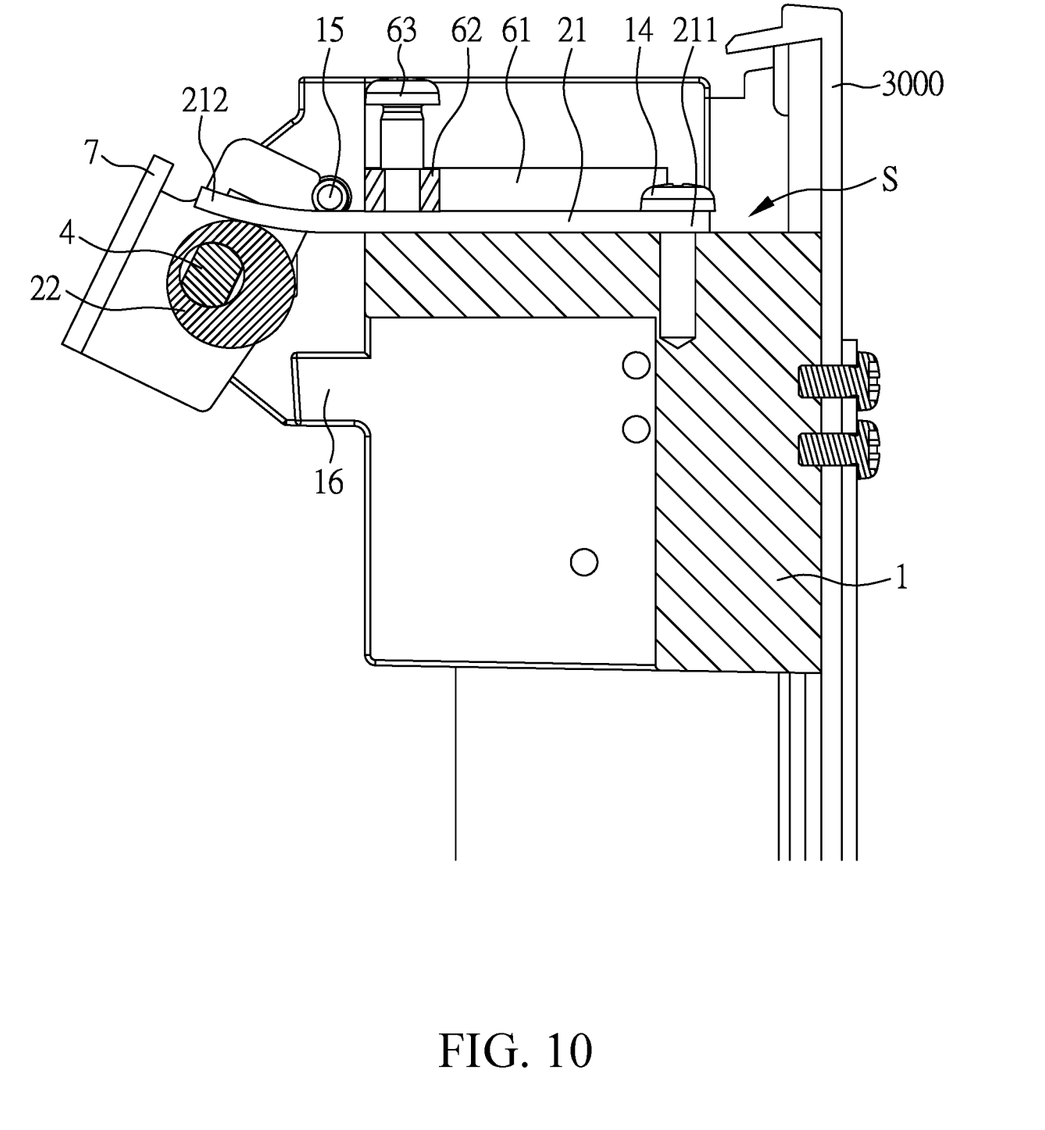
FIG. 10 is a cross-sectional view showing an operation of the hinge device of an embodiment of the present invention connected to a supporting device.

In another embodiment, the elastic module 2 can only have one elastic plate 21. Or, in another embodiment, the elastic module 2 has a plurality of elastic plates 21. The user may decide the number of the elastic plates 21, which interfere with the cam 22, according to the needs. As shown in FIG. 10, the supporting seat 1 and the supporting device 3000 define a receiving slot S integrally. The receiving slot S is located behind the position that the fixed ends 211 of the elastic plates 21 is secured to the supporting seat 1. The screw hole 2111 of the at least one elastic plate 21 is an elongated hole. The screw hole 2111 has a front end adjacent to the shaft 4 and a rear end away from the shaft 4. FIG. 10 shows the state that the connecting elements 14 are screwed at the rear ends. When the connecting elements 14 are adjusted to be screwed at the front ends, the fixed ends 211 of the elastic plates 21 or at least part of the inflexible section move backward into the receiving slot S. The free ends 212 of the elastic plates 21 or at least part of the flexible section L do not abut against the cam 22, and the elastic plates 21 can be unloaded and do not work on the cam 22. Before the display device 2000 is disposed on the bearing plate 7, the user may move the elastic plates 21 which are not going to be used to the receiving slot S along the direction of being distant from the display device 2000 according to the weight of the carried display device 2000. The elastic plates 21 would not contact with the cam 22, and the goal is achieved.

In summary, the present invention provides another kind of hinge device that replaces the conventional torsional spring with an elastic plate.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A hinge device for supporting a display device, the hinge device comprising:
    a supporting seat;
    a shaft rotatably passing through the supporting seat along an axis;
    a bearing plate being disposed on the shaft, rotating along with the shaft relative to the supporting seat, bearing the display device, and being adapted to tilt between a first position and a second position; and
    an elastic module including a cam and at least one elastic plate, the cam being configured on the shaft and rotating synchronously with the shaft, the elastic plate extending towards a direction that is not parallel to the axis and having an inflexible section and a flexible section, the inflexible section and the flexible section being connected to each other and defining a fixed end and a free end, lengths of the inflexible section and the flexible section being changeable, the fixed end being fixed to the supporting seat, the free end abutting against the cam optionally, the elastic plate having a deformation amount to provide a balance torque when the elastic plate abutting against the cam;
    wherein, when an external force is applied on the display device to adjust a tilt angle, the bearing plate is actuated to drive the shaft to rotate so that the cam rotates synchronously to change the deformation amount and the balance torque of the elastic plate, and when the external force is removed, the display device can be stopped at once at a position between the first position and the second position.

2. The hinge device as claimed in claim 1, wherein the display device constantly provides a main torque to the shaft, a direction of the balance torque is opposite to a direction of the main torque so that the balance torque countervails the main torque, when the display device and the bearing plate rotate from the first position to the second position, the main torque and the balance torque gradually increase, and when the display device and the bearing plate rotate from the second position to the first position, the main torque and the balance torque gradually decrease.

3. The hinge device as claimed in claim 2, wherein the cam has a first abutting part and a second abutting part, a distance between the first abutting part and the axis is smaller than a distance between the second abutting part and the axis, when the bearing plate is at the first position, the elastic plate abuts against the first abutting part of the cam, and when the bearing plate is at the second position, the elastic plate abuts against the second abutting part of the cam.

4. The hinge device as claimed in claim 3, wherein the cam further has a curved surface section between the first abutting part and the second abutting part.

5. The hinge device as claimed in claim 4, wherein the supporting seat includes a main body and two side plates, the side plates extend outwards from two sides of the main body, and the shaft passes through the side plates.

6. The hinge device as claimed in claim 5, wherein the supporting seat further includes at least one positioning hole and at least one connecting element, the positioning hole is formed on an upper surface of the main body, the fixed end has a threaded hole, and the connecting element passes through the threaded hole and is tightened in the positioning hole.

7. The hinge device as claimed in claim 6, wherein the cam has a through hole formed at an axle center of the cam for the shaft passing through.

8. The hinge device as claimed in claim 6, wherein the cam is a cylinder and has a through hole eccentrically formed on the cam for the shaft passing through.

9. The hinge device as claimed in claim 6, wherein the cam and the shaft are integrated.

10. The hinge device as claimed in claim 6, wherein the supporting seat further includes an upper stopper and a lower stopper, when the cam is at the first position, the bearing plate abuts against the upper stopper, and when the cam is at the second position, the bearing plate abuts against the lower stopper.

11. The hinge device as claimed in claim 7, wherein the elastic module further includes at least one screw hole and at least one abutting element, the screw hole is formed on the cam and connected to the through hole, and the abutting element passes through the screw hole and abuts against the shaft so that the shaft is fixed to the cam, and the cam and the shaft rotates synchronously.

12. The hinge device as claimed in claim 1, wherein the elastic plate is a leaf spring and has a thickness between 2-10 millimeters.

13. The hinge device as claimed in claim 6, wherein a number of the at least one elastic plate is larger than or equal to two, the screw hole of at least one of the elastic plates is an elongated hole, the screw hole has a front end adjacent to the shaft and a rear end away from the shaft, and when the corresponding connecting element is screwed at the front end, the corresponding elastic plate does not abut against the cam.

14. The hinge device as claimed in claim 5, further comprising an adjustment module, wherein the adjustment module is disposed on the supporting seat and optionally presses against different positions of the elastic plate to change the length of the flexible section of the elastic plate.

15. The hinge device as claimed in claim 14, wherein the adjustment module includes a pressing element optionally moving relative to the elastic plate, and the length of the flexible section of the elastic plate is changed through adjusting a position of the pressing element relative to the elastic plate.

16. The hinge device as claimed in claim 15, where the adjustment module further includes two sliding slots and at least one securing element, the pressing element has at least one screw hole, the sliding slots are respectively formed on the side plates, the pressing element is movably disposed in the slide slots, and the securing element detachably passes through the screw hole of the pressing element to tighten the elastic plate.

\* \* \* \* \*